United States Patent
Maruta

(10) Patent No.: US 9,269,351 B2
(45) Date of Patent: Feb. 23, 2016

(54) VOICE RECOGNITION DEVICE

(75) Inventor: Yuzo Maruta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/398,933

(22) PCT Filed: Jul. 3, 2012

(86) PCT No.: PCT/JP2012/066974
§ 371 (c)(1),
(2), (4) Date: Nov. 4, 2014

(87) PCT Pub. No.: WO2014/006690
PCT Pub. Date: Jan. 9, 2014

(65) Prior Publication Data
US 2015/0120300 A1    Apr. 30, 2015

(51) Int. Cl.
| | | |
|---|---|---|
| *G10L 15/00* | (2013.01) | |
| *G10L 15/08* | (2006.01) | |
| *G06F 3/16* | (2006.01) | |
| *G06F 17/30* | (2006.01) | |
| *G10L 17/22* | (2013.01) | |
| *G10L 15/22* | (2006.01) | |

(52) U.S. Cl.
CPC . *G10L 15/08* (2013.01); *G06F 3/16* (2013.01); *G06F 3/167* (2013.01); *G06F 17/30* (2013.01); *G06F 17/30746* (2013.01); *G10L 17/22* (2013.01); *G10L 15/22* (2013.01); *G10L 2015/226* (2013.01)

(58) Field of Classification Search
CPC .......... G10L 15/22; G10L 17/22; G06F 3/167
See application file for complete search history.

(56) References Cited

U.S. PATENT DOCUMENTS

| | | | | |
|---|---|---|---|---|
| 7,386,454 | B2 * | 6/2008 | Gopinath | G10L 15/22 704/251 |
| 2009/0018832 | A1 * | 1/2009 | Mukaigaito | G10L 15/1815 704/251 |
| 2011/0178804 | A1 | 7/2011 | Inoue et al. | |
| 2014/0156279 | A1 * | 6/2014 | Okamoto | G10L 15/18 704/257 |
| 2015/0006167 | A1 * | 1/2015 | Kato | G10L 15/22 704/231 |

FOREIGN PATENT DOCUMENTS

| | | |
|---|---|---|
| JP | 2002-297374 A | 10/2002 |
| JP | 2007-206886 A | 8/2007 |
| JP | 2008-14818 A | 1/2008 |
| JP | 2011-75525 A | 4/2011 |
| WO | WO 2008/136105 A1 | 11/2008 |
| WO | WO 2009/147745 A1 | 12/2009 |
| WO | WO 2010/013369 A1 | 2/2010 |

* cited by examiner

*Primary Examiner* — Daniel Abebe
(74) *Attorney, Agent, or Firm* — Birch, Stewart, Kolasch & Birch, LLP

(57) ABSTRACT

According to a voice recognition device of this invention, with respect to a keyword extracted by a voice recognition unit from a speech content by a user, display contents each displayed by an operation by the user and their respective numbers of display times are stored as history information, and a search level is set through determination of whether or not the same operations and displays have been made by a predetermined number of times or more. This makes it possible, at the next time the same keyword is extracted, to immediately present information of such a level that the user requires, and thus, detailed information necessary for the user can always be provided efficiently, so that the convenience of the user is enhanced.

6 Claims, 12 Drawing Sheets

FIG.3

| Keyword | Search Level | | |
|---|---|---|---|
| | 1 | 2 | 3 |
| Gas Station | Name & Address | Business Hours | - |
| | | Price | - |
| Convenience Store | Name & Address | Business Hours | - |
| | | Recommended Product | Price |
| ⋮ | ⋮ | ⋮ | ⋮ |

| Keyword | Search Level | Appendix Information |
|---|---|---|
| Gas Station | 2 | Business Hours |
| Convenience Store | 1 | |
| ⋮ | ⋮ | ⋮ |

(b)

| Keyword | Search Level | Appendix Information |
|---|---|---|
| Gas Station | 2 | Business Hours |
| | | Price |
| Convenience Store | 1 | Name & Address |
| ⋮ | ⋮ | ⋮ |

FIG.5

| Keyword | Hierarchy 1 | Number of Times | Hierarchy 2 | Number of Times | Hierarchy 3 | Number of Times |
|---|---|---|---|---|---|---|
| Gas Station | Name & Address Display | 6 | Business Hours Display | 2 | - | - |
| | | | Price Display | 0 | - | - |
| Convenience Store | Name & Address Display | 5 | Business Hours Display | 4 | - | - |
| | | | Recommended Product Display | 4 | Price Display | 1 |
| ⋮ | ⋮ | ⋮ | ⋮ | ⋮ | ⋮ | ⋮ |

| Keyword | Hierarchy 1 | Number of Times | Hierarchy 2 | Number of Times |
|---|---|---|---|---|
| Gas Station | Name & Address Display | 2 | Business Hours Display | 1 |
| | | | Price Display | 0 |

(b)

| Keyword | Hierarchy 1 | Number of Times | Hierarchy 2 | Number of Times |
|---|---|---|---|---|
| Gas Station | Name & Address Display | 3 | Business Hours Display | 2 |
| | | | Price Display | 0 |

(c)

| Keyword | Hierarchy 1 | Number of Times | Hierarchy 2 | Number of Times |
|---|---|---|---|---|
| Gas Station | Name & Address Display | 4 | Business Hours Display | 2 |
| | | | Price Display | 2 |

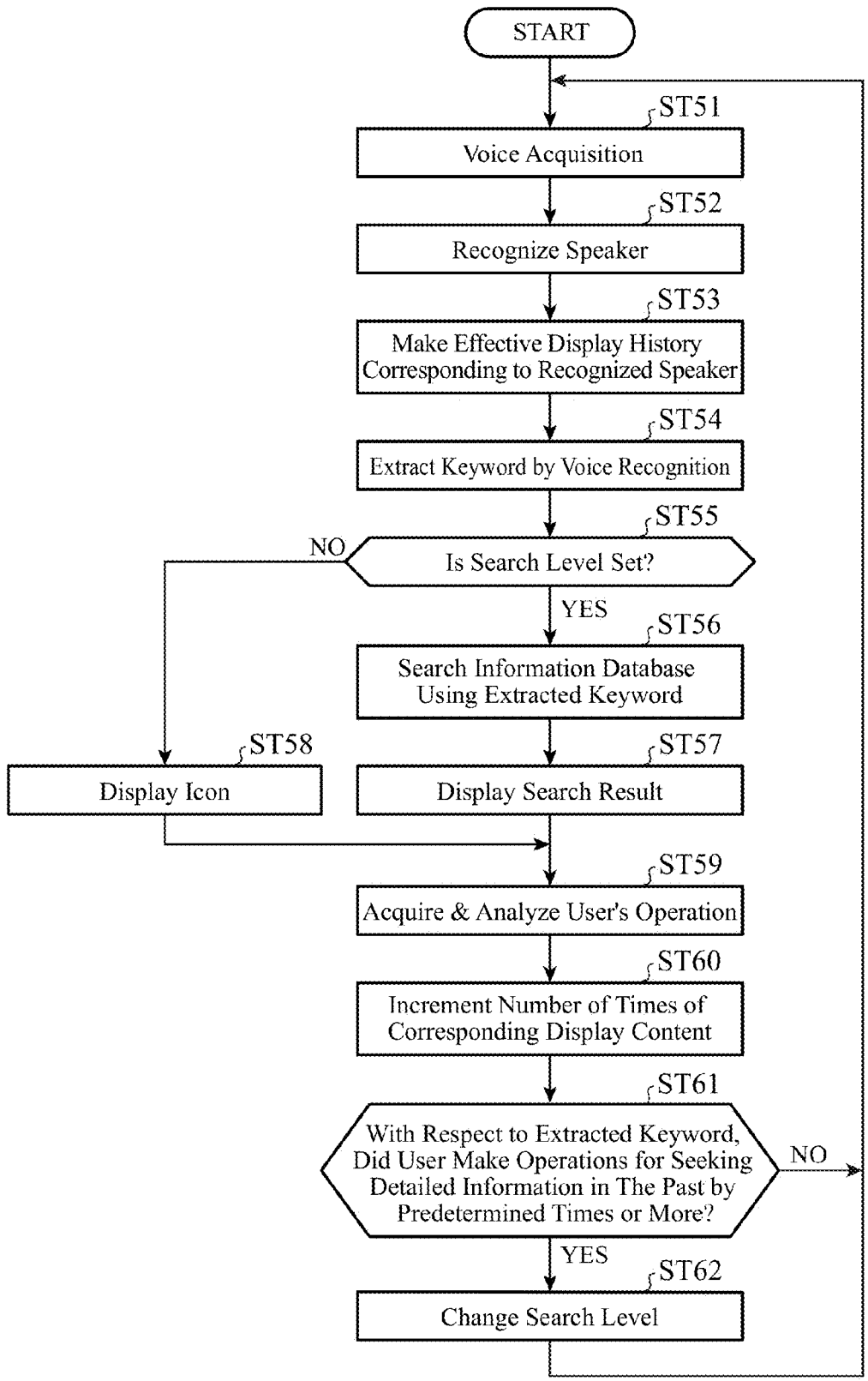

VOICE RECOGNITION DEVICE

TECHNICAL FIELD

The present invention relates to a voice recognition device that recognizes a voice spoken by a user so as to make an information search.

BACKGROUND ART

With respect to voice recognition functions installed in car-navigation systems or the like, a passenger (user) generally specifies (or orders) a start of speech for the system. For that purpose, a button for ordering a start of voice recognition (hereinafter, referred to as a voice-recognition-start ordering unit) is displayed on a touch panel or mounted on a steering wheel. Then, the voice is recognized that is spoken after the voice-recognition-start ordering unit is pushed down by the passenger (user). That is, the voice-recognition-start ordering unit outputs a voice-recognition start signal, and a voice recognition unit, upon receiving that signal, detects from voice data acquired by a voice acquisition unit after reception of that signal, a voice period corresponding to the content spoken by the passenger (user) to thereby perform processing of voice recognition.

However, there is also a voice recognition device that always recognizes the content spoken by the passenger (user) even without a voice-recognition start order by the passenger (user). That is, even though not receiving a voice-recognition start signal, the voice recognition unit detects a voice period corresponding to each content spoken by the passenger (user) from voice data acquired by the voice acquisition unit and extracts feature values of the voice data in that voice period, to thereby repeatedly perform: processing for recognition on the basis of the feature values using a recognition dictionary; and processing for outputting a character string resulting from voice recognition or for searching a database on the basis of the character string to display a search result.

In Patent Document 1, for example, there is disclosed a voice recognition device in which voice recognition is performed by constantly inputting a voice spoken by a user, its recognition result is displayed, and thereafter, processing based on the recognition result is executed through a determination operation made by the user using an operation button.

CITATION LIST

Patent Document

Patent Document 1: Japanese Patent Application Laid-open No. 2008-14818

SUMMARY OF THE INVENTION

Problems to be Solved by the Invention

However, according to the conventional voice recognition device as in, for example, Patent Document 1, there is a problem that when the same speech is recognized, what is displayed is always just the same level of search result. That is, when the user speaks the words "Gas Station", just the shop names and their locations of the adjacent gas stations are always displayed, thus causing a problem that in order for the user to know a price for every gas station, it is further required every time to perform a given operation separately.

This invention has been made to solve the problem as described above, and an object thereof is to provide a voice recognition device that can immediately present information of such a level that the user requires.

Means for Solving the Problems

In order to accomplish the above object, a voice recognition device of this invention is characterized by comprising: a voice acquisition unit that detects and acquires a voice spoken by a user; a voice recognition unit that recognizes data of the voice acquired by the voice acquisition unit, to extract a keyword; an operation input unit that receives input of an operation from the user; a display unit that presents information to the user; an operation-responsive analyzing unit that specifies the operation by the user on the basis of information received by the operation input unit and information displayed on the display unit; an operation/display history storing unit that stores, as history information, display contents each displayed on the display unit by the operation specified by the operation-responsive analyzing unit and their respective numbers of display times, for every keyword extracted by the voice recognition unit; a search level setting unit that sets a search level for the keyword extracted by the voice recognition unit according to the history information stored in the operation/display history storing unit; an information search control unit that searches information using, as a search key, the keyword extracted by the voice recognition unit, according to the search level set by the search level setting unit, to thereby acquire a search result; and an information presentation control unit that orders the display unit to display the search result acquired by the information search control unit; wherein, with respect to the keyword extracted by the voice recognition unit, the search level setting unit changes the search level therefor when the number of display times in the history information stored in the operation/display history storing unit becomes a predetermined number or more.

Effect of the Invention

According to the voice recognition device of the invention, because information of the level that the user requires can be immediately presented and thus, detailed information necessary for the user can always be provided efficiently, the convenience of the user is enhanced.

BRIEF DESCRIPTION OF THE DRAWINGS

FIG. 3 is a diagram showing an example of definitions of search levels.

FIG. 4 is diagrams each showing an example of the search level for every keyword set in an information search control unit.

FIG. 5 is a diagram showing an operation history and display history by a user for every keyword, stored in an operation/display history storing unit.

FIG. 7 is diagrams showing a case where an operation history and display history stored in the operation/display history storing unit is updated with respect to one of keywords (Gas Station).

FIG. 14 is a flowchart showing an operation of the voice recognition device in Embodiment 4.

MODES FOR CARRYING OUT THE INVENTION

Hereinafter, embodiments for carrying out the invention will be described with reference to the drawings.

Figure 1:
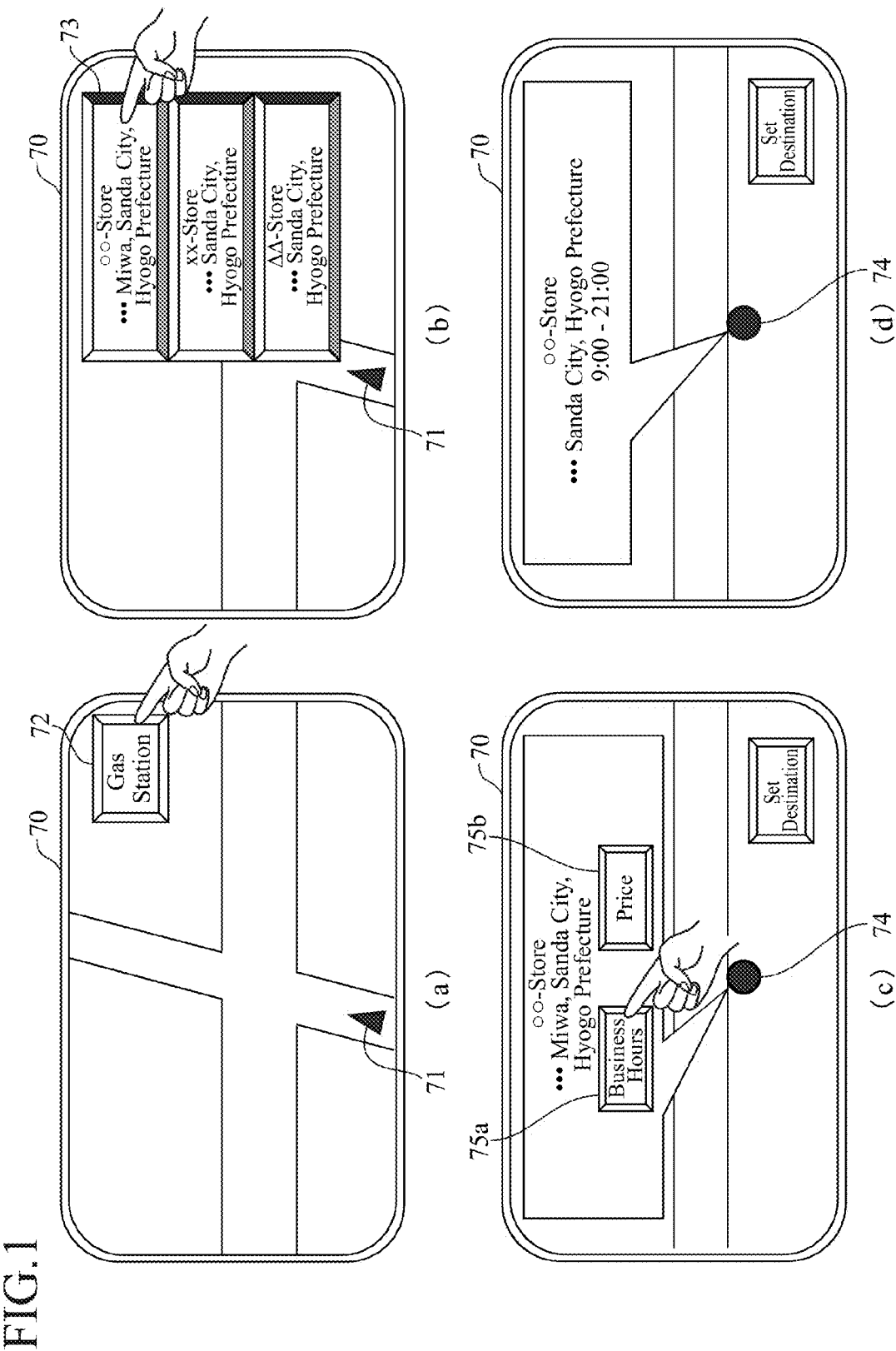
FIG. 1 is diagrams each showing an example of display screen image of a navigation device.

First of all, description will be made about a navigation device with voice recognition device incorporated therein, which forms a basis of this invention. FIG. 1 is a diagram showing an example of a display screen image of a usual navigation device.

Here is assumed, for example, that in a vehicle with the navigation device installed therein, the following talk is made in a state where a general map for route-guidance and a host-vehicle mark 71 are displayed on a screen 70 of the navigation device.

User A: "Isn't it about time to run out of gas?"

User B: "Is there any gas station nearby?"

Then, a genre-name icon 72 corresponding to a genre name included in the speech content (in this case, "Gas Station") is displayed on the screen 70 of the navigation device (FIG. 1(a)). When the user pushes down that icon 72, any gas station near the current location is searched for, and as search results, for example, names, addresses, etc., of the gas stations are displayed in a form of a search result list 73 (FIG. 1(b)).

Subsequently, when the user selects one of the thus-displayed search results, location information of the selected gas station is displayed as a facility mark 74, and further, a detail button 75 for displaying detailed information of that gas station, for example, its business hours, a gas price, etc., (for example, a "Business Hours" button 75a and a "Price" button 75b) is displayed (FIG. 1(c)). Here, when the user pushes down the "Business Hours" button 75a, the business hours of the gas station are displayed (FIG. 1(d)).

it is noted that in any one of the following embodiments, description will be made citing a case of a facility search based on a genre, such as a gas station as described above; however, information to be searched for in this invention is not limited to the facility information, and may instead be traffic information, weather information, residence information, news, music information, movie information, program information, or the like.
Embodiment 1.

Figure 2:
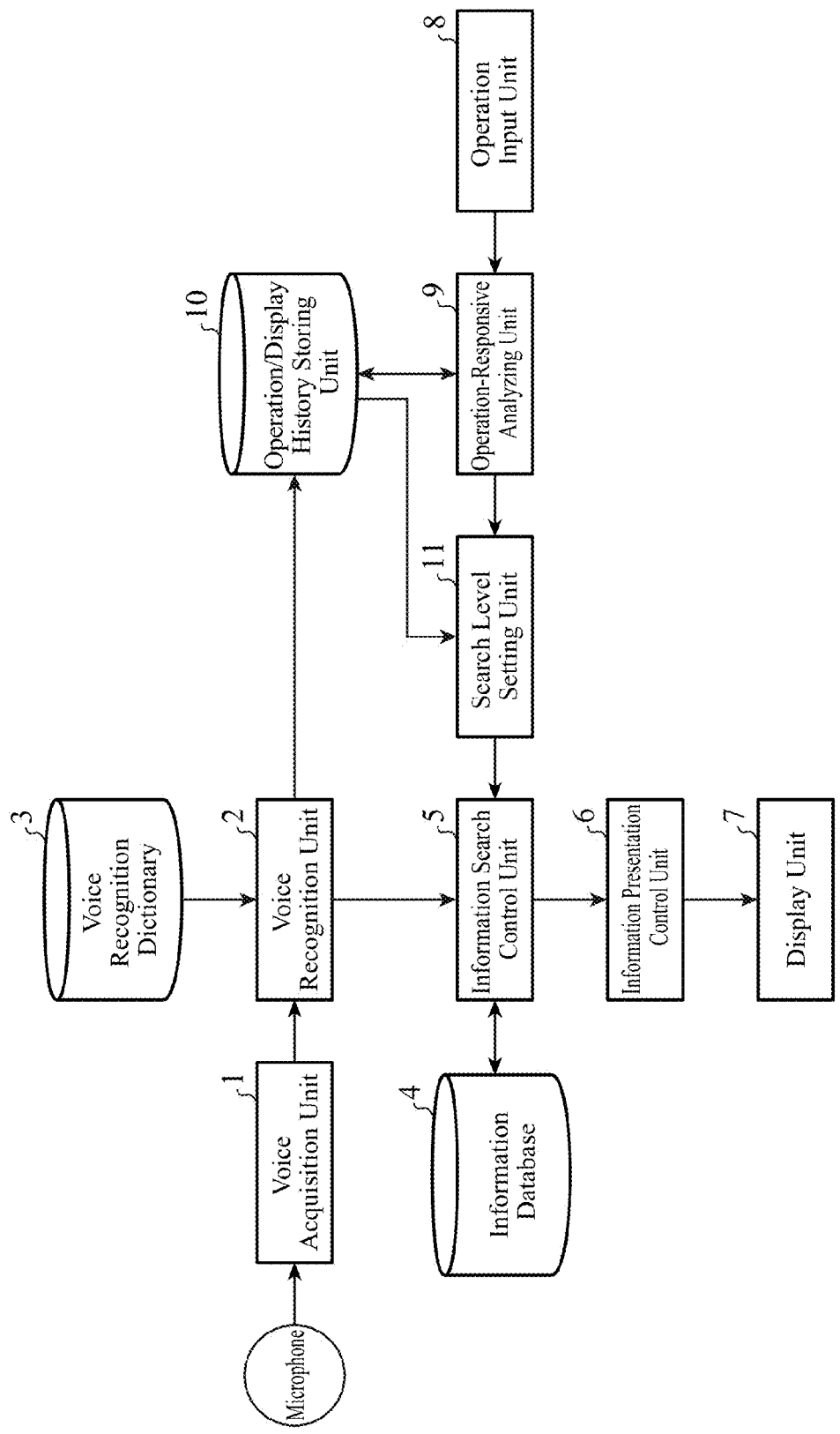
FIG. 2 is a block diagram showing an example of a voice recognition device according to Embodiment 1.

FIG. 2 is a block diagram showing an example of a voice recognition device according to Embodiment 1 of the invention. This voice recognition device is to be used by being incorporated in a navigation device installed in a vehicle (moving object), and includes a voice acquisition unit 1, a voice recognition unit 2, a voice recognition dictionary 3, an information database 4, an information search control unit 5, an information presentation control unit 6, a display unit 7, an operation input unit 8, an operation-responsive analyzing unit 9, an operation/display history storing unit 10 and a search level setting unit 11.

The voice acquisition unit 1 takes in a user's speech having been sound-collected by a microphone, that is, an input voice, and subjects it to A/D (Analog/Digital) conversion using a PCM (Pulse Code modulation), for example.

The voice recognition unit 2 detects a voice period corresponding to the content spoken by the user from the voice signal digitized by the voice acquisition unit 1, extracts feature values of the voice data in that voice period, performs recognition processing using the voice recognition dictionary 3 on the basis of the feature values, and outputs a character string resulting from the voice recognition. Note that the recognition processing may be performed using a typical method such as a HMM (Hidden Markov Model) method, for example.

Meanwhile, with respect to voice recognition functions installed in car-navigation systems or the like, the user generally specifies (or orders) a start of speech for the system. For that purpose, a button for ordering a start of voice recognition (hereinafter, referred to as a voice-recognition-start ordering unit) is displayed on a touch panel or mounted on a steering wheel. Then, the voice is recognized that is spoken after the voice-recognition-start ordering unit is pushed down by the user. That is, the voice-recognition-start ordering unit outputs a voice-recognition start signal, and a voice recognition unit, upon receiving that signal, detects from voice data acquired by the voice acquisition unit after reception of that signal, the voice period corresponding to the content spoken by the user to thereby perform the voice recognition processing described above.

However, the voice recognition unit 2 in Embodiment 1 always recognizes the content spoken by the user even without the above-described voice-recognition start order by the user. That is, even though not receiving a voice-recognition start signal, when the navigation device with this voice recognition device incorporated therein is being activated, the voice recognition unit 2 always detects a voice period corresponding to each content spoken by the user from the voice data acquired by the voice acquisition unit 1 and extracts feature values of the voice data in that voice period, to thereby repeatedly perform: processing for recognition on the basis of the feature values using the voice recognition dictionary 3; and processing for outputting a character string resulting from voice recognition. The same applies to the following embodiments.

The information database 4 stores at least one or more of facility information, residence information, song information and the like. The facility information includes, for example, a facility name, a genre to which the facility belongs, location data, business hours, presence/absence of parking space, and the like; the residence information includes, for example, an address, location data, and the like; and the song information includes, for example, information of an album name, an artist name, a song title, an age, and the like. Here, description will be made assuming that the facility information is stored in the information database 4; however, such information may instead be traffic information, weather information, residence information, news, music information, movie information, program information, or the like. Note that the information database 4 may be stored, for example, in a HDD or a flash memory, or may be located on a network to be accessed through a communication means (not shown).

The information search control unit 5 searches the information database 4 using a keyword output by the voice recognition unit 2 as a search key, according to a later-described search level set by the search level setting unit 11, to thereby acquire information. Here, the search level is an index that represents what level (what hierarchy) of detailed information is to be acquired from the information database 4, and is defined for every keyword.

In FIG. 3, an example of definitions of the search levels is shown. For example, when making a search using a keyword "Gas Station" as a search key, if the search level having been set is "1", acquisition will be made up to a facility name and residence information, and if the search level is "2", in addition to a facility name and residence information, information of at least one or more specified item(s) selected from business hours and a gas price is acquired. When no search level is being set, the information search control unit 5 does not perform processing for searching. Note that setting the search level to "0" may act to set no search level.

FIG. 4 shows examples of the search levels for every keyword set in the information search control unit 5 by the later-described search level setting unit 11. Here, if there is a plurality of items at a single search level as in the case of the keyword "Gas Station" in FIG. 3, one of the items may be set as appendix information as shown in FIG. 4(a). In this case, information of business hours is acquired in addition to a facility name and residence information. Instead, a plurality of items may be set as appendix information as shown in FIG. 4(b). Further, it may be designed to acquire, when only a search level is set, information related to all of items in that level.

The information presentation control unit 6 orders the later-described display unit 7 to display an icon or a search result acquired by the information search control unit 5 according to the search level. Specifically, if no search level is being set, the information presentation control unit causes the genre-name icon 72 as in FIG. 1(a) to be displayed, and if a search level is being set, causes the search result acquired by the information search control unit 5 to be displayed in a form of the search result list 73 shown in FIG. 1(b).

The display unit 7 is a display-integrated touch panel and is configured, for example, with an LCD (Liquid Crystal Display) and a touch sensor, to thereby display the search result in response to the order from the information presentation control unit 6. Besides, the user can make an operation by directly touching the display unit (touch panel) 7.

The operation input unit 8 is an operation key, an operation button, a touch panel or the like, that receives input of an operation from the user so as to input a user's order to the on-vehicle navigation device. Examples of various orders by the user include those made by a hardware switch mounted on an on-vehicle composite navigation device, a touch switch built in and displayed on the display, a recognizer that recognizes the order through a remote controller mounted on a steering wheel, etc., or a separate remote controller, and the like.

The operation-responsive analyzing unit 9 specifies the use's operation on the basis of information received by the operation input unit 8, on-screen information displayed on the display unit 7, and the like. Note that how to specify the user's operation is not an essential matter of this invention and may be determined using a publicly known technique, so that its description is omitted here.

The operation/display history storing unit 10 is a storing unit that stores, as history information, display contents each displayed on the display unit 7 by the user's operation specified by the operation-responsive analyzing unit 9 and their respective numbers of display times, for every keyword extracted by the voice recognition unit 2. FIG. 5 shows the history information by the user for every keyword, stored in the operation/display history storing unit 10. For example, as shown in FIG. 5, the storing unit is storing display contents each displayed by the user's operation and the number of display times of each content as a pair, and then, if the operation-responsive analyzing unit 9 specifies the user's operation, the number for that content displayed by said operation is incremented and stored.

With reference to the history information stored in the operation/display history storing unit 10, the search level setting unit 11 sets a search level for every keyword to be used as a search key in the information search control unit 5, according to the history information. Here, the search level to be set for the information search control unit 5 is assumed to be such a level that corresponds to a display content whose number of display times is a predetermined number or more (or, a display content whose number of display times is more than the predetermined number). Then, with respect to each keyword extracted by the voice recognition unit 2, when the number of display times in the history information stored in the operation/display history storing unit 10 becomes the predetermined number or more, the search level is changed, i.e. every time the number of display times becomes the predetermined number or more, the search level is increased.

For example, in the case where the predetermined number given as a threshold value is set to three, with respect to the keyword "Gas Station" shown in FIG. 5, the number of times of Name & Address Display in Hierarchy 1 is six, the number of times of Business Hours Display in Hierarchy 2 is two and the number of times of Price Display is zero, so that the search level "1" is set at which a search is made for Name & Address (see, FIG. 3) which corresponds to the predetermined number of three or more. Besides, on this occasion, if an operation for displaying business hours is made by the user, the number of times of Business Hours Display is updated to three. Thus, when the keyword "Gas Station" is then extracted, the search level is increased to "2" because the number of display times of Business Hours has been the predetermined number of three or more.

Meanwhile, when there are a plurality of contents whose each number of display times is more than the predetermined number, it suffices to set the search level for the display content in the deepest hierarchy, for example. In a specific example where the predetermined number given as a threshold value is likewise set to three, with respect to the keyword "Convenience Store" shown in FIG. 5, the number of times of Name & Address Display in Hierarchy 1 is five and the numbers of times of Business Hours Display and Recommended Product Display in Hierarchy 2 are both four, so that the search level "2" is set at which a search is made for Business Hours and Recommended Product (see, FIG. 3) that are display contents each corresponding to the predetermined number of three or more and placed in the deepest hierarchy.

Here, as the predetermined number given as a threshold value, which has been described as three in every instance, the same value may be used for all of the keywords, or a different value may be used for every keyword.

Note that the herein-described method of setting the search level is just an example, and it is allowable to set the search level that has been determined by another method.

Next, using the flowchart shown in FIG. 6, an operation of the voice recognition device of Embodiment 1 will be described.

First, the voice acquisition unit 1 takes in the user's speech having been sound-collected by a microphone, that is, an input voice, and subjects it to A/D conversion using a PCM, for example (Step ST01).

Then, the voice recognition unit 2 detects a voice period corresponding to the content spoken by the user from the voice signal digitized by the voice acquisition unit 1, extracts feature values of the voice data in that voice period, and performs recognition processing using the voice recognition dictionary 3 on the basis of the feature values, to thereby extract and output a character string to be given as a keyword (Step ST02).

Then, the information search control unit 5, when the search level is being set by the search level setting unit 11 (in the case of "YES" in Step ST03), searches the information database 4 according to that search level using the keyword output by the voice recognition unit 2 as a search key, to thereby acquires information (Step ST04). Thereafter, the information presentation control unit 6 orders the display unit 7 to display the search result acquired by the information search control unit (Step ST05).

In contrast, when no search level is being set (in the case of "NO" in Step ST03), an icon corresponding to that keyword is displayed (Step ST06).

Subsequently, when an operation is given on the display screen by the user through the operation input unit 8, the operation-responsive analyzing unit 9 analyzes that operation to thereby specify the user's operation (Step ST07), and then increments the number of times with respect to the content displayed for that search keyword by the specified user's operation, to thereby update the operation history and the display history stored in the operation/display history storing unit 10 (Step ST08).

The search level setting unit 11 determines, with respect to the keyword extracted in Step ST02, whether or not there is a display content whose number of display times stored in the operation/display history storing unit 10 is equal to or more than the predetermined number that is a pre-set threshold value (Step ST09). If determined that there is no display content whose number of times is the predetermined number or more (in the case of "NO" in Step ST09), the flow returns to Step ST01. In contrast, if determined that there is a display content whose number of times is the predetermined number or more (in the case of "YES" in Step ST09), a search level is determined based on that content, and the search level is set for the information search control unit 5 (Step ST10).

Next, description will be made citing a specific example. Note that, for description's sake, the initial state is assumed to be such that no search level is set in the information search control unit 5, and every number of display times on the screen is zero for every keyword. Further, "a predetermined number" to be used as a threshold value at the time of the determination in the search level setting unit 11, is assumed to be two.

User A: "Isn't it about time to run out of gas?"
User B: "Is there any gas station nearby?"

For example, the above talk is assumed to be made in a vehicle with the navigation device installed therein in a state where a general map for route-guidance and the host-vehicle mark 71 are displayed on the screen 70 of the navigation device, the voice signal digitized by the voice acquisition unit 1 is recognized by the voice recognition unit 2, so that the keyword "Gas Station" is extracted and output (Step ST01, Step ST02).

Here, in the initial state, because no search level is set for the keyword "Gas Station" in the information search control unit 5 as described above, no search of the information database 4 is made by the information search control unit 5 (in the case of "NO" in Step ST03). Then, an indication corresponding to the unset search level, that is, the genre-name icon 73 of "Gas Station", is displayed on the screen 70 of the display unit 7 as shown, for example, in FIG. 1(*a*) (Step ST06).

Then, when operations shown in FIG. 1(*a*), (*b*), (*c*) are made by the user so that the screen image as in FIG. 1(*d*) is displayed, it is specified by the operation-responsive analyzing unit 9 that Name & Address Display and Business Hours Display have been made through these operations in FIG. 1(*a*), (*b*), (*c*), and the numbers of Name & Address Display and Business Hours Display with respect to the keyword "Gas Station" are incremented so that the content in the operation/display history storing unit 10 is updated (Step ST07, Step ST08). As a result, in the operation/display history storing unit 10, such a history with the number of times "1" of Name & Address Display, the number of times "1" of Business Hours Display and the number of times "0" of Price Display is stored with respect to the keyword "Gas Station".

Further, at another time, if the users make the above talk thus causing a display up to Name & Address, the information stored in the operation/display history storing unit 10 becomes to have such a content comprising the number of times "2" of Name & Address Display, the number of times "1" of Business Hours Display and the number of times "0" of Price Display as shown in FIG. 7(*a*). Thus, because the number of Name & Address Display becomes equal to or more than the predetermined number "2" given as a threshold value, the search level "1" is set for the information search control unit 5 (Step ST09, Step ST10).

Figure 8:
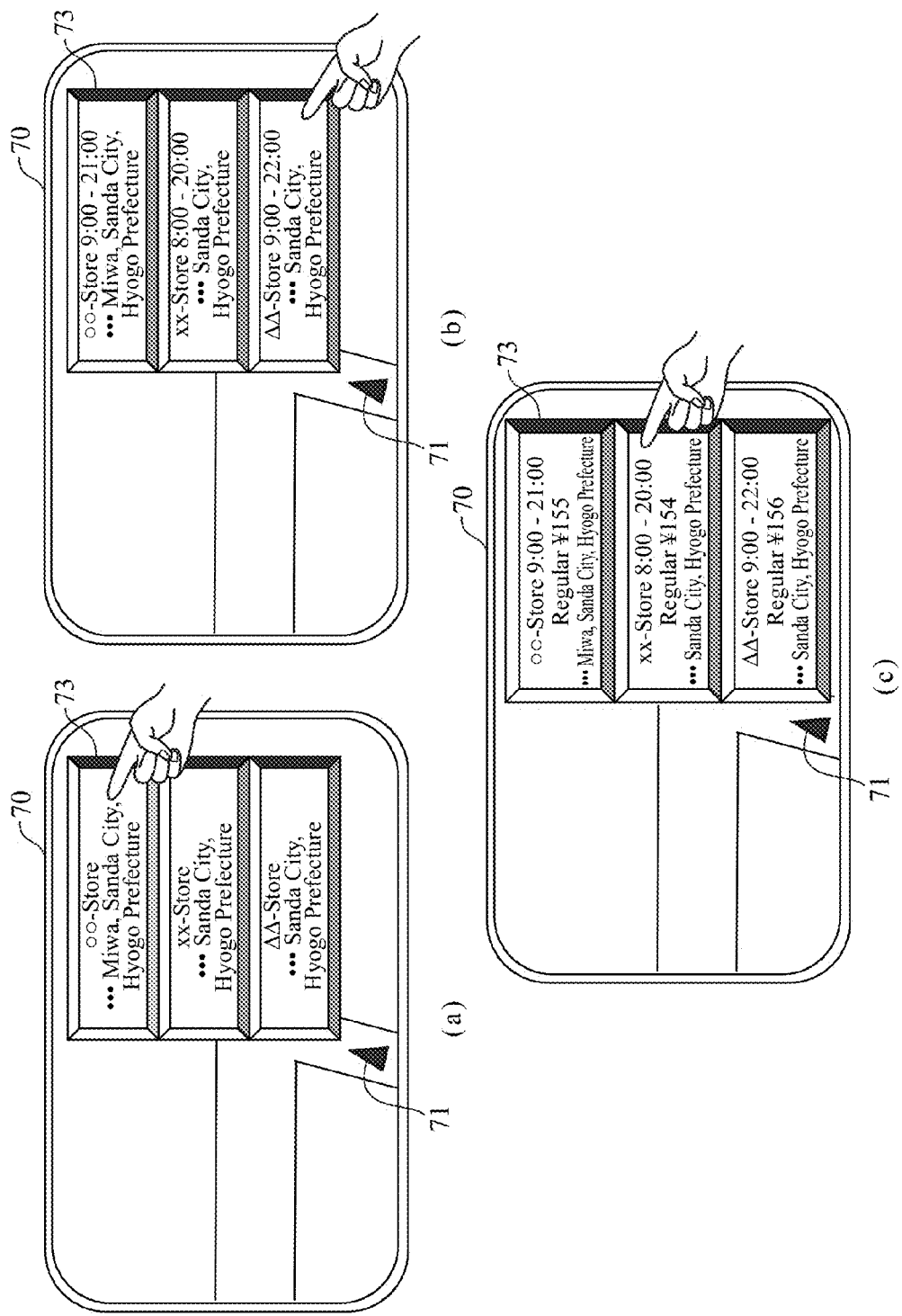
FIG. 8 is diagrams each showing a display example of a search result.

At still another time, if the users make the above talk, because the search level "1" is being set with respect to the keyword "Gas Station" in the information search control unit 5, information of Name & Address is acquired from the information database 4, and as a search result, the search result list 73 is displayed as shown in FIG. 8(*a*) (in the case of "YES" in Step ST03, Step ST04, Step ST05). Here, when the user selects one in the search result, the screen image shown in FIG. 1(*c*) is displayed. Further, the information stored in the operation/display history storing unit 10 becomes to have such a content comprising the number of times "3" of Name/Address Display, the number of times "2" of Business Hours Display and the number of times "0" of Price Display, as shown in FIG. 7(*b*). Thus, because the number of times of Business Hour Display becomes equal to or more than the predetermined number "2" given as a threshold value, the search level "2" and the appendix information of "Business Hours" are set for the information search control unit 5.

Likewise, at still yet another time, if the users make the above talk when the information stored in the operation/display history storing unit 10 is as shown in FIG. 7(*b*), because the search level "2" and the appendix information of "Business Hours" are being set in the information search control unit 5, information up to Business Hours are acquired from the information database 4, and as a search result, the search result list 73 including Business Hours is displayed as shown in FIG. 8(*b*). Here, when the user selects one in the search result, the screen image shown in FIG. 1(*d*) is displayed.

Instead, when the information stored in the operation/display history storing unit 10 comprises, as shown in FIG. 7(*c*), the number of times "4" of Name & Address Display, the number of times "2" of Business Hours Display and the number of times "2" of Price Display, because all of the items have the number equal to or more than the predetermined number "2" to be used as a threshold value for the determination in the search level setting unit 11, the search level "2" and the appendix information of "Business Hours" & "Price" (or, no appendix information) are set for the information search control unit 5.

In such a state, if the users further make the above talk, because the search level "2" and the appendix information of "Business Hours" & "Price" (or no appendix information) are being set in the information search control unit 5, information up to Business Hours & Price are acquired from the information database 4, and as a search result, the search result list 73 including up to Business Hours & Price is displayed as shown in FIG. 8(*c*).

As described above, according to Embodiment 1, with respect to the keyword extracted by the voice recognition unit 5 from a speech content by the user, display contents each displayed by the user's operation and their respective numbers of display times are stored as history information, and the search level is set through determination whether or not the same operations and displays have been made by a predetermined number of times or more, that is, for example, whether or not the user confirms business hours every time he/she views information of "Gas Station". Therefore, at the next time the same keyword is extracted, information of such a level that the user requires can be immediately presented and thus, detailed information necessary for the user can always be provided efficiently, so that the convenience of the user is enhanced.

Embodiment 2.

Figure 9:
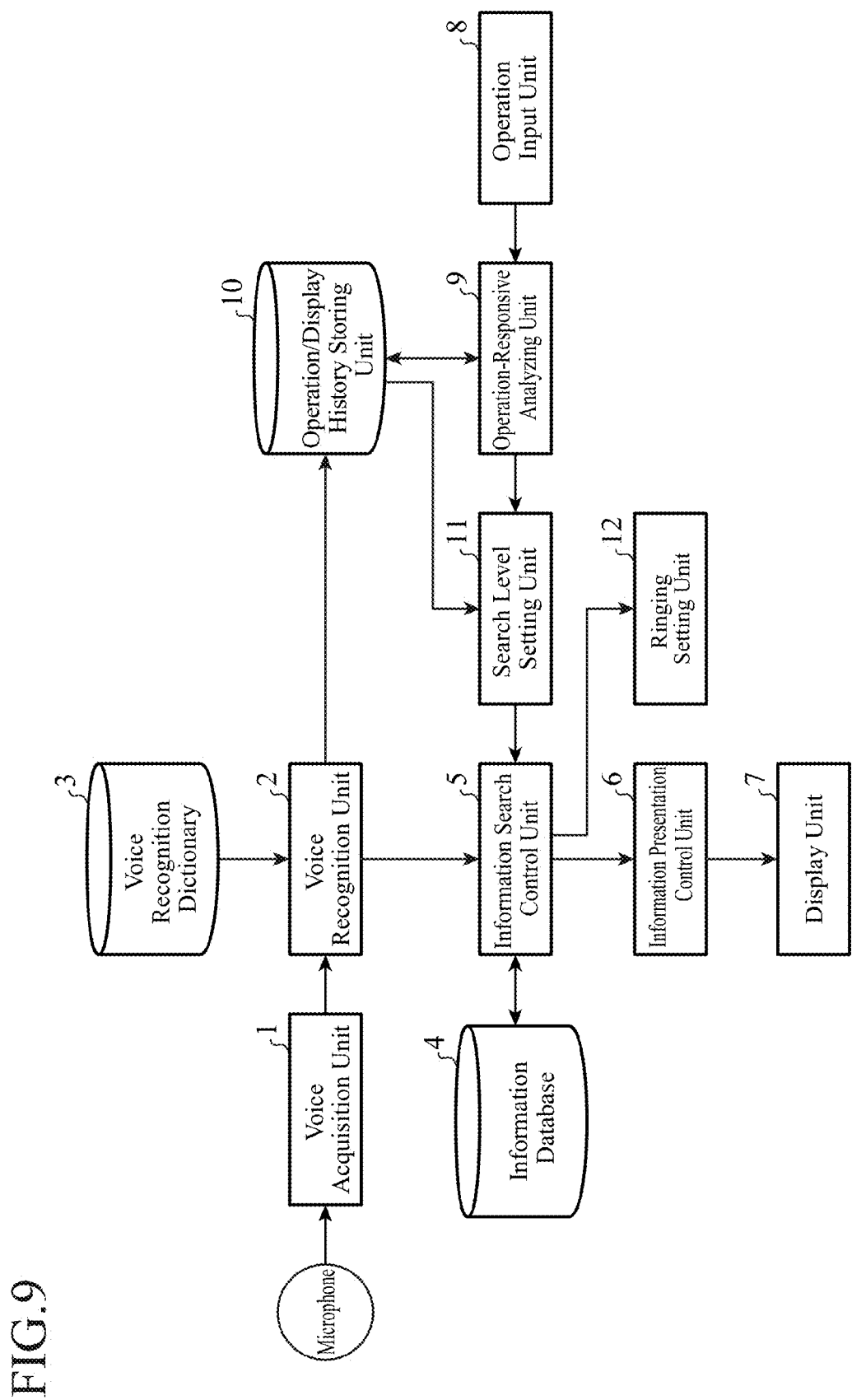
FIG. 9 is a block diagram showing an example of a voice recognition device according to Embodiment 2.

FIG. 9 is a block diagram showing an example of a voice recognition device according to Embodiment 2. Note that the same reference numerals are given for the components similar to those described in Embodiment 1, so that duplicated description thereof is omitted here. As compared to Embodiment 1, Embodiment 2 described below further comprises a ringing setting unit 12, to thereby call attention to the user when the number of information-display times by the user with respect to the keyword recognized by the voice recognition unit 2 is a predetermined number or more (or more than the predetermined number).

When the search level "1" or more is set (or a search level more than a predetermined value set) by the search level setting unit 11, the information search control unit 5 orders the ringing setting unit 12 to make an output, on the basis of the number of information-display times by the user with respect to the keyword recognized by the voice recognition unit 2.

Upon receipt of the order from the information search control unit 5, the ringing setting unit 12 changes the setting of the navigation device so as to make a predetermined output. Here, the predetermined output means a ringing output by predetermined vibration or sound/voice, such as, for example, a vibration of seat, an output of alarm sound and a voice output notifying the recognition of that keyword.

Next, an operation of the voice recognition device of Embodiment 2 will be described using the flowchart shown in FIG. 10.

Figure 6:
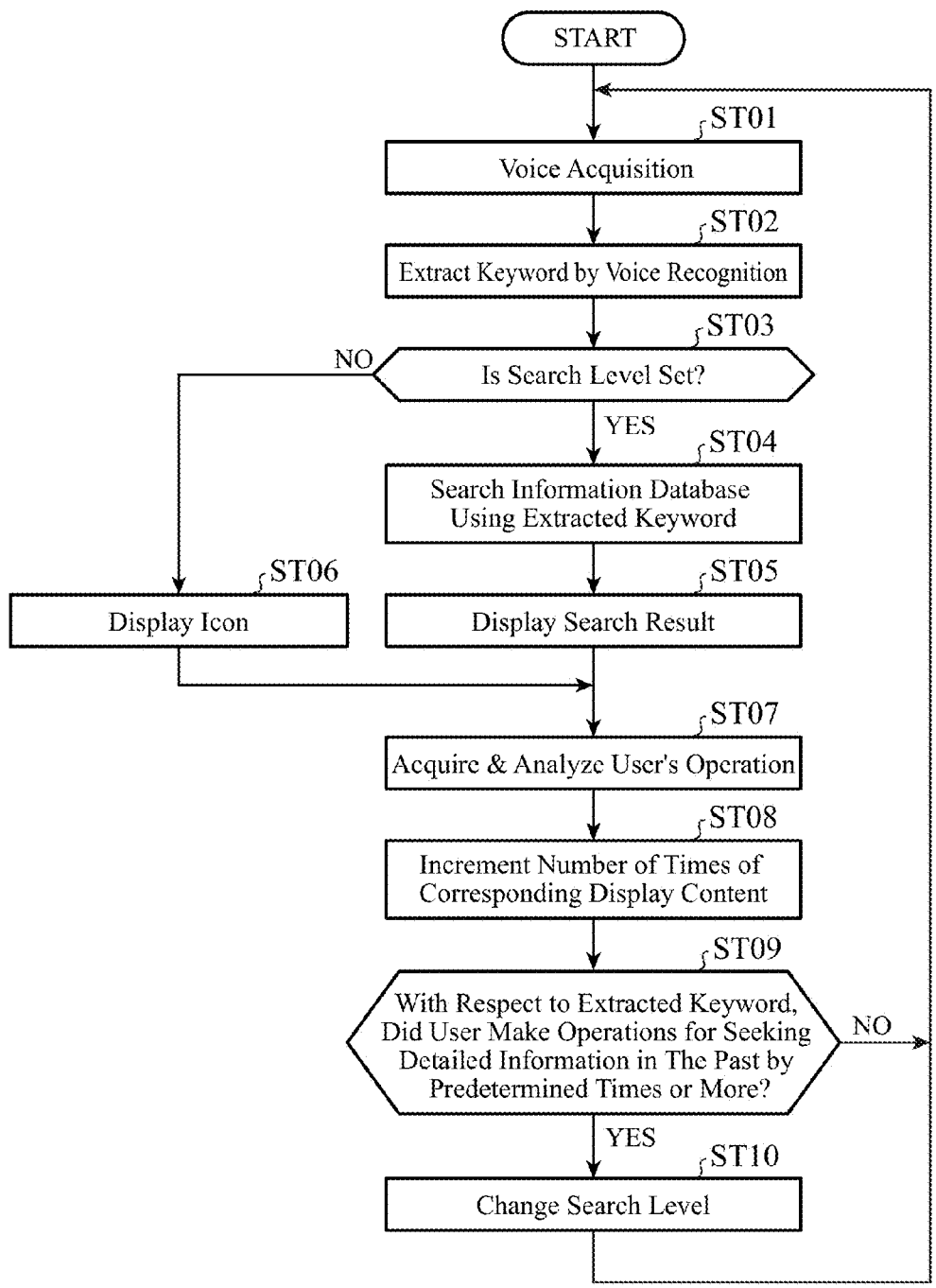
FIG. 6 is a flowchart showing an operation of the voice recognition device in Embodiment 1.

With respect to the processing from Steps ST11 to ST19, because they are the same as Steps ST01 to ST09 in the flowchart of FIG. 6 in Embodiment 1, so that description thereof is omitted here.

Then, if it is determined, with respect to the keyword extracted by the voice recognition unit 2, that there is a display content whose number of times in operation history and display history is the predetermined number or more (in the case of "YES" in Step ST19), a search level is set similarly to Embodiment 1 (Step ST20), and thereafter, the ringing setting unit 12 changes a ringing setting to thereby make the predetermined output (Step ST21).

As described above, according to Embodiment 2, with respect to the keyword extracted by the voice recognition unit from a speech content by the user, if it is determined that the user has, in the past, caused information related to the keyword to be displayed by the predetermined number of times or more (or, more than the predetermined number of times), that is, according to the search level for the keyword, the ringing setting unit makes the predetermined output by vibration or sound/voice to thereby call attention to the user. Thus, the user can properly recognize that here is a situation where detailed information matched to the search level is being immediately presented.

Embodiment 3.

Figure 11:
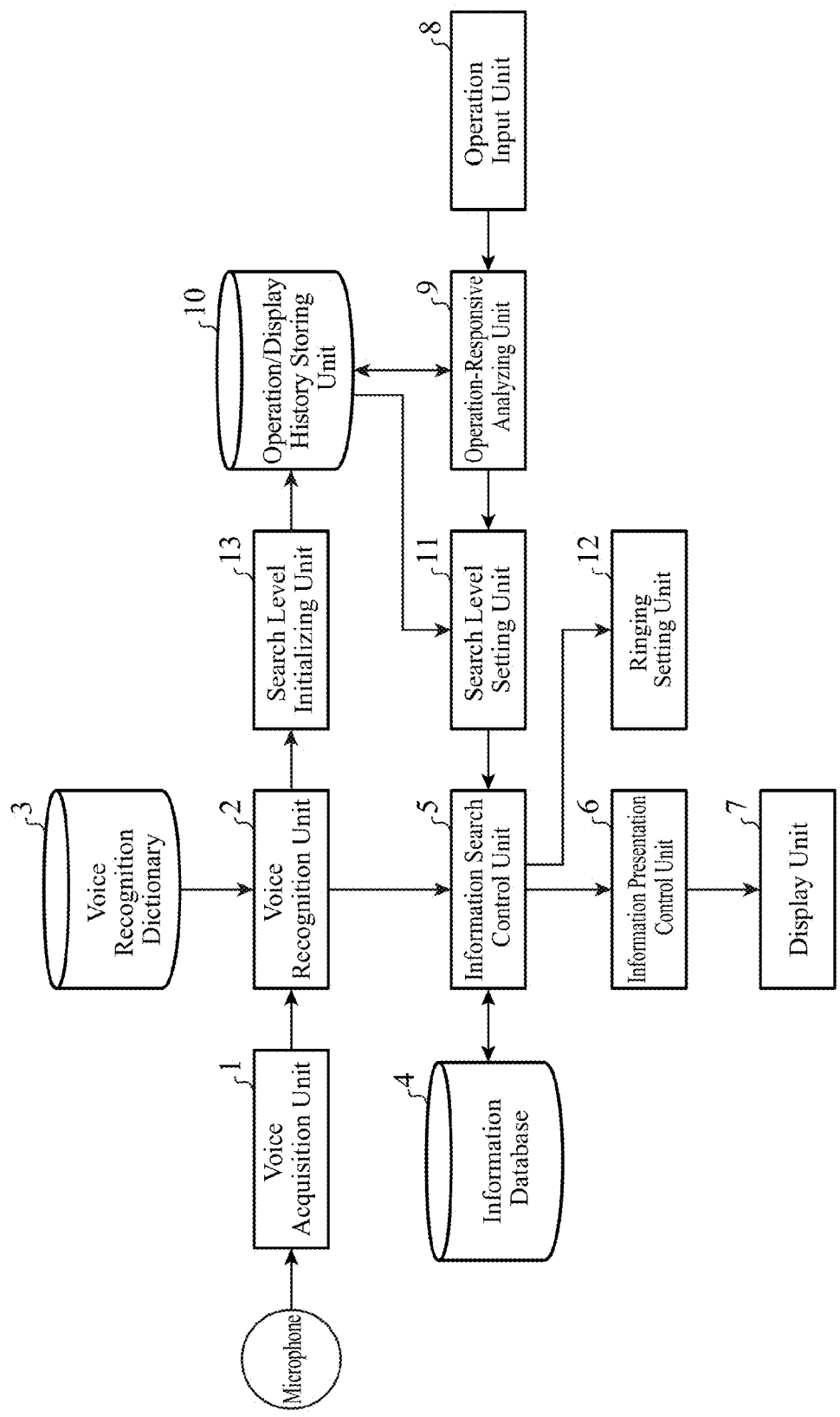
FIG. 11 is a block diagram showing an example of a voice recognition device according to Embodiment 3.

FIG. 11 is a block diagram showing an example of a voice recognition device according to Embodiment 3 of the invention. Note that the same reference numerals are given for the components similar to those described in Embodiments 1 and 2, so that duplicated description thereof is omitted here. As compared to Embodiment 2, Embodiment 3 described below further comprises a search level initializing unit 13, so that the user, when wants to initialize, can initialize the history information stored in the operation/display history storing unit 10 by way of speech.

The voice recognition dictionary 3 is configured to be capable of further recognizing a keyword such as "Initialize", "Reset" and the like that means a command for restoring the history information stored in the operation/display history storing unit 10 to an initial state, and the voice recognition unit 2 outputs that keyword as a recognition result.

When a keyword such as "Initialize", "Reset" or the like that means the command for restoring to the initial state, is extracted by the voice recognition unit 2, the search level initializing unit 13 initializes the history information stored in the operation/display history storing unit 10.

Figure 12:
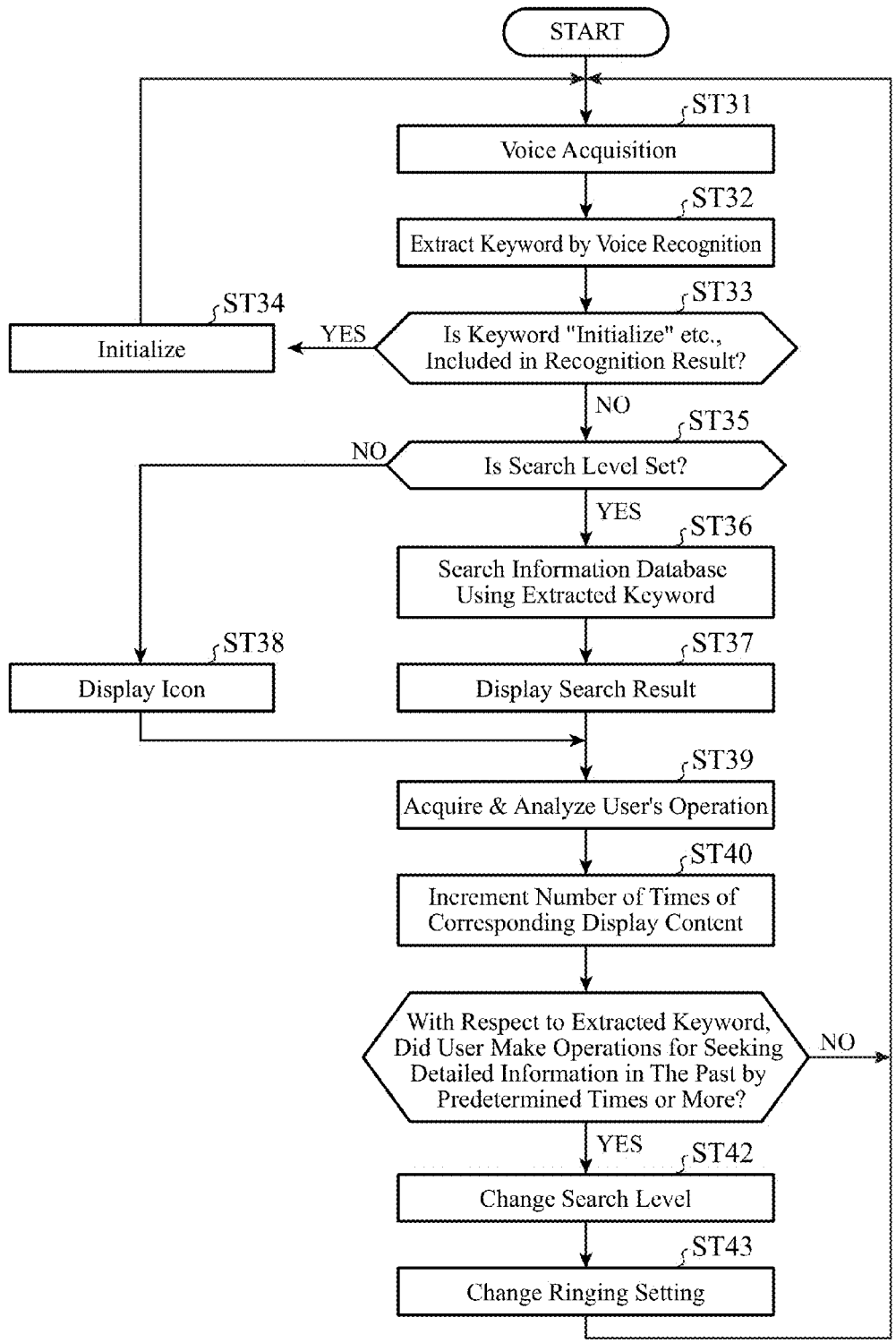
FIG. 12 is a flowchart showing an operation of the voice recognition device in Embodiment 3.

Next, an operation of the voice recognition device of Embodiment 3 will be described using the flowchart shown in FIG. 12.

Figure 10:
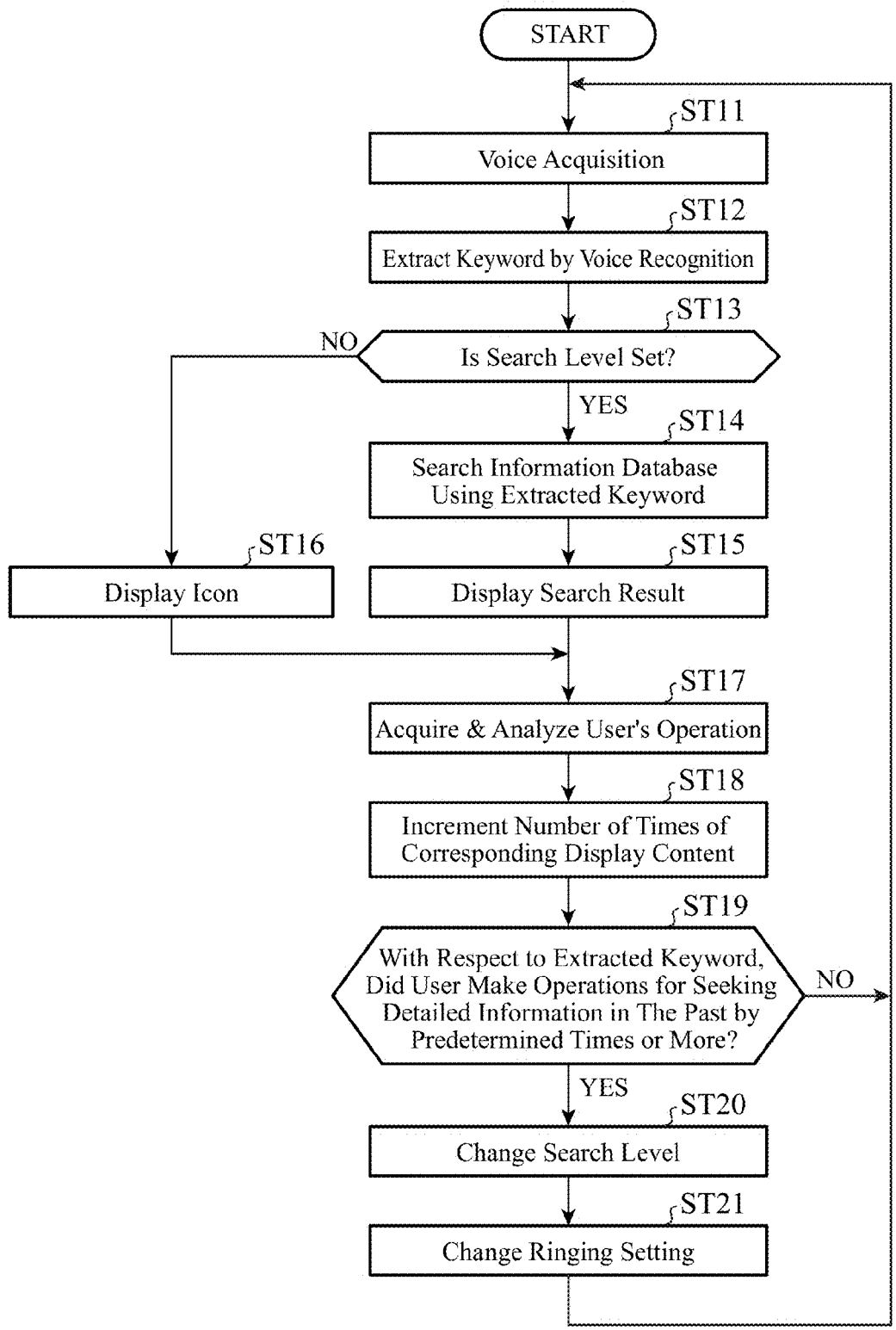
FIG. 10 is a flowchart showing an operation of the voice recognition device in Embodiment 2.

The processing from Steps ST31 to 32 and from Steps ST35 to 42, are the same as Steps ST11 to 12 and Steps ST13 to 20 in the flowchart of FIG. 10 in Embodiment 2, so that description thereof is omitted here.

Then, if the keyword extracted by the voice recognition unit 2 in Step ST32 is a keyword such as "Initialize", "Reset" or the like that means the command for restoring to the initial state (in the case of "YES" in Step ST33), the information stored in the operation/display history storing unit 10 is initialized, that is, restored to the initial state (Step ST34). Instead, if it is other than that keyword, processing in Step ST35 and its following Steps is performed.

As described above, according to Embodiment 3, if the keyword extracted by the voice recognition unit from the content spoken by the user is a keyword such as "Initialize", "Reset" or the like that means the command for restoring to the initial state, the history information stored in the operation/display history storing unit is initialized. Thus, when the user wants to initialize, that is, for example, when the display of detailed information comes out of the user's expectation, or when the user is changed, it is possible to restore the content in the operation/display history storing unit to the initial state merely by speaking the keyword that means the above command.

Embodiment 4.

Figure 13:
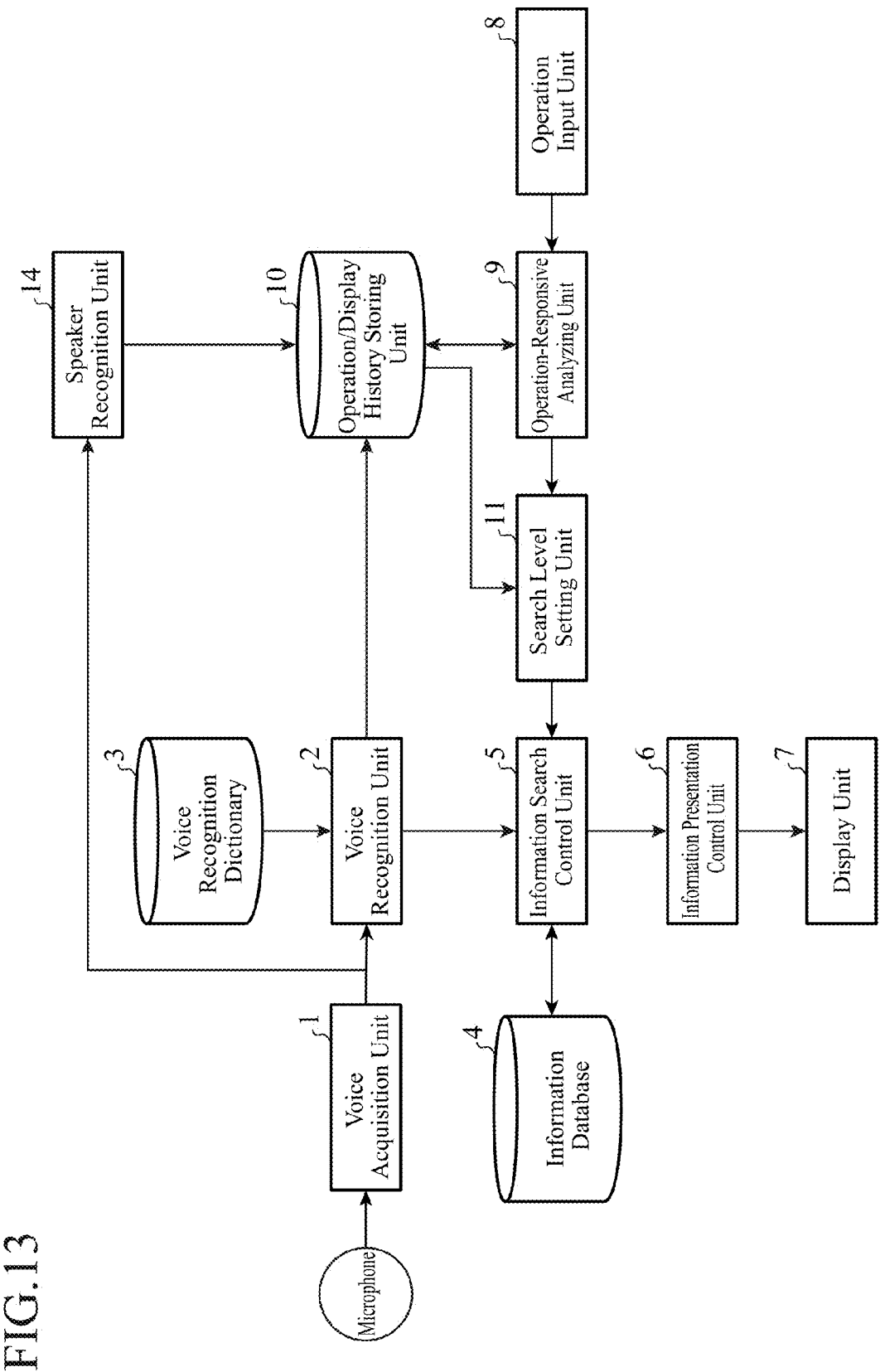
FIG. 13 is a block diagram showing an example of a voice recognition device according to Embodiment 4.

FIG. 13 is a block diagram showing an example of a voice recognition device according to Embodiment 4 of the invention. Note that the same reference numerals are given for the components similar to those described in Embodiments 1 to 3, so that duplicated description thereof is omitted here. As compared to Embodiment 1, Embodiment 4 described below further comprises a speaker recognition unit 14, so that the history information to be referred to is changed for every speaker (user who makes a speech).

The speaker recognition unit 14 analyzes the voice signal digitized by the voice recognition unit 1 to thereby recognize the speaker (user who makes a speech). Here, how to recognize the speaker is not an essential matter of this invention and may be given using a publicly known technique, so that its description is omitted here.

The operation/display history storing unit 10 is retaining history information as shown in FIG. 5 for every user. Then, when the speaker (user who makes a speech) is recognized by the speaker recognition unit 14, the history information corresponding to the thus-recognized user is made effective. The other processing is the same as that in Embodiment 1, so that its description is omitted. Note that the speaker recognized by the speaker recognition unit 14 is assumed to be the user who operated the operation input unit 8.

The search level setting unit 11 refers to the history information that is being stored in and made effective by, the operation/display history storing unit 10, to thereby set the search level for every keyword to be used as a search key in the information search control unit 5, according to that history information.

Next, an operation of the voice recognition device of Embodiment 4 will be described using the flowchart shown in FIG. 14.

First, the voice acquisition unit 1 takes in the user's speech having been sound-collected by a microphone, that is, an input voice, and subjects it to A/D conversion using a PCM, for example (Step ST51).

Then, the speaker recognition unit 14 analyzes the voice signal having been taken in by the voice recognition unit 1 to thereby recognize the speaker (Step ST52).

Then, the operation-responsive analyzing unit 9 makes effective the history information that corresponds to the speaker recognized by the speaker recognition unit 14, among those in the operation/display history storing unit 10 (Step ST53).

With respect to the following processing from Steps ST54 to ST62, because they are the same as Steps ST02 to ST10 in the flowchart of FIG. 6 shown in Embodiment 1, so that description thereof is omitted here.

As described above, according to Embodiment 4, the speaker is recognized through a speech of the user, the search level is set with reference to the history information stored for every speaker, and the detailed information according to the search level is displayed. Thus, even if the user is changed who uses the navigation device with the voice recognition device incorporated therein, information of such a level that each user requires can be immediately presented, and thus detailed information necessary for each user can always be provided efficiently, so that the convenience of the user is further enhanced.

It is noted that, in the above embodiments, it is assumed that the speech content by the user are always recognized; however, the voice recognition may be made only in a given period (for example, when the user pushes down a button for voice recognition, a period that the button is being pushed down, or a predetermined period of time after the button is pushed down). Further, it is allowable that the user can select whether to recognize always or to recognize only in a given period.

However, as in the above embodiments, by configuring such that the voice acquisition and the voice recognition are always performed without user's attention when the navigation device with this voice recognition device incorporated therein is being activated, if any speech is given, the voice acquisition and the voice recognition are automatically performed and a keyword is extracted from the voice recognition result, so that information of the level that the user requires is immediately displayed after setting the search level. Thus, a user's manual operation, a user's intension to output, or the like for starting the voice acquisition and the voice recognition is not required, and thus detailed information necessary for the user can always be provided efficiently.

Meanwhile, in the above embodiments, description has been made assuming that the voice recognition device is to be incorporated in a navigation device for on-vehicle use; however, a device to which the voice recognition device of the invention is to be incorporated is not limited to the navigation device for on-vehicle use, and thus the voice recognition device may be applied to any form of device so long as it can search and display information through interaction between a user and that device, such as, navigation devices for moving objects including a human, a vehicle, a train, a ship, an airplane, etc.; portable navigation devices; portable information-processing devices; and the like.

It is noted that unlimited combination of the respective embodiments, modification of any element in the embodiments and omission of any element in the embodiments may be made in the present invention without departing from the scope of the invention.

INDUSTRIAL APPLICABILITY

A device to which the voice recognition device of the invention is to be incorporated is not limited to a navigation device for on-vehicle use, and the voice recognition device may be applied to any form of device so long as it can search and display information through interaction between a user and that device, such as, navigation devices for moving objects including a human, a vehicle, a train, a ship, an airplane, etc.; portable navigation devices; portable information-processing devices; and the like.

DESCRIPTION OF REFERENCE NUMERALS AND SIGNS

1: voice acquisition unit, 2: voice recognition unit, 3: voice recognition dictionary, 4: information database, 5: information search control unit, 6: information presentation control unit, 7: display unit, 8: operation input unit, 9: operation-responsive analyzing unit, 10: operation/display history storing unit, 11: search level setting unit, 12: ringing setting unit, 13: search level initializing unit, 14: speaker recognition unit, 70: screen of navigation device, 71: host-vehicle mark, 72: genre-name icon, 73: search result list, 74: facility mark, 75: detail button.

The invention claimed is:

1. A voice recognition device comprising:
   a voice acquisition unit that detects and acquires a voice spoken by a user;
   a voice recognition unit that recognizes data of the voice acquired by the voice acquisition unit, to extract a keyword;
   an operation input unit that receives input of an operation from the user;
   a display unit that presents information to the user;
   an operation-responsive analyzing unit that specifies the operation by the user on the basis of information received by the operation input unit and information displayed on the display unit;
   an operation/display history storing unit that stores, as history information, display contents each displayed on the display unit by the operation specified by the operation-responsive analyzing unit and their respective numbers of display times, for every keyword extracted by the voice recognition unit;

a search level setting unit that sets a search level for the keyword extracted by the voice recognition unit according to the history information stored in the operation/display history storing unit;

an information search control unit that searches information using, as a search key, the keyword extracted by the voice recognition unit, according to the search level set by the search level setting unit, to thereby acquire a search result; and an information presentation control unit that orders the display unit to display the search result acquired by the information search control unit;

wherein, with respect to the keyword extracted by the voice recognition unit, the search level setting unit changes the search level therefor when the number of display times in the history information stored in the operation/display history storing unit becomes a predetermined number or more.

2. The voice recognition unit of claim 1, wherein, with respect to the keyword extracted by the voice recognition unit, the search level setting unit increases the search level every time the number of display times in the history information stored in the operation/display history storing unit becomes a predetermined number or more.

3. The voice recognition device of claim 1, wherein the information to be searched using, as a search key, the keyword extracted by the voice recognition unit, is any one of facility information, traffic information, weather information, residence information, news, music information, movie information and program information.

4. The voice recognition device of claim 1, further comprising a speaker recognition unit that specifies the user who spoke the voice acquired by the voice acquisition unit; wherein, the operation/display history storing unit stores the history information for every user and makes effective the history information of the user specified by the speaker recognition unit; and the search level setting unit sets the search level with reference to the history information made effective by the operation/display history storing unit.

5. The voice recognition device of claim 1, further comprising a ringing setting unit that calls attention by vibration or sound/voice to the user according to the search level.

6. The voice recognition device of claim 1, further comprising a search level initializing unit that restores the history information stored in the operation/display history storing unit to an initial state when the keyword extracted by the voice recognition unit is a keyword that represents a command for restoring to the initial state.

* * * * *